(No Model.)
F. LANGMAAK & P. STREIFF.
Velocipede.
No. 228,908. Patented June 15, 1880.
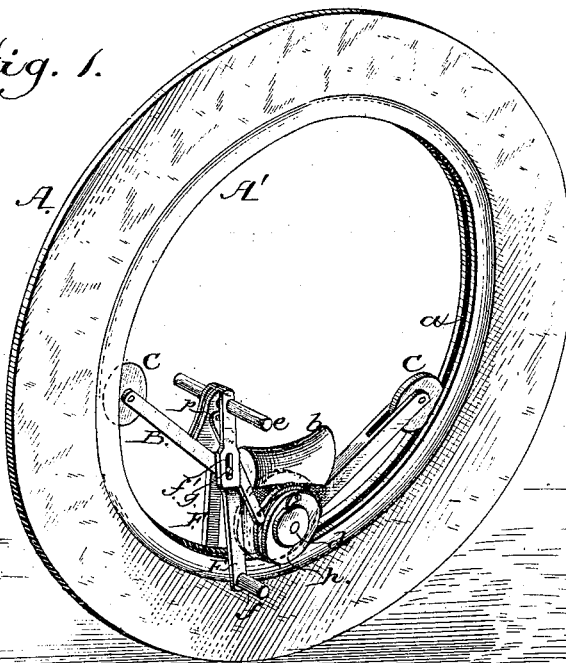
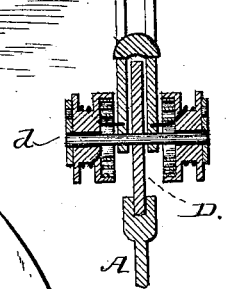
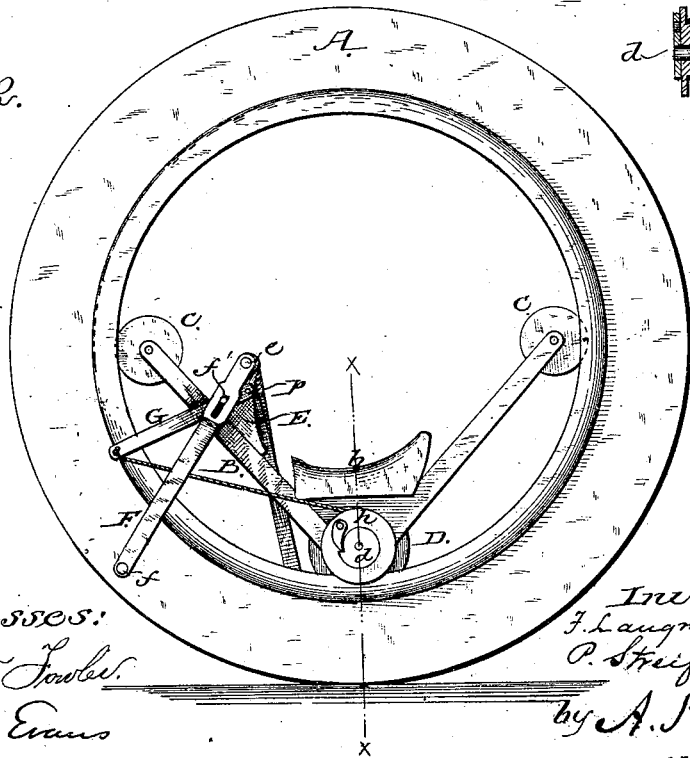
Witnesses:
J. Walter Fowler
R. K. Evans
Inventor's:
F. Langmaak
P. Streiff
by A. H. Evans & Co
Attorneys

UNITED STATES PATENT OFFICE.

FRIEDRICH LANGMAAK AND PETER STREIFF, OF SAN FRANCISCO, CAL.

VELOCIPEDE.

SPECIFICATION forming part of Letters Patent No. 228,908, dated June 15, 1880.

Application filed March 23, 1880. (No model.)

*To all whom it may concern:*

Be it known that we, FRIEDRICH LANGMAAK and PETER STREIFF, of the city and county of San Francisco, and State of California, have invented an Improved Velocipede; and we hereby declare the following to be a full, clear, and exact description thereof.

Our invention relates to certain improvements in velocipedes; and our improvements consist in placing within the open hub of a single wheel a carriage provided with driving and guide wheels moving in an annular groove inside the hub, this carriage being provided with a saddle, upon which the rider sits astride, combined with operating foot-levers, which, by means of cords, rotate alternately clutches on the shaft of the central driving-wheel of the carriage. These clutches are so arranged that they engage with the driving-shaft on the forward motion, but release it when the foot is drawn back for the return-stroke. By having a pair of the levers an alternate motion is kept up and a continuous revolution of the driving-wheel maintained.

Figure 1 is a perspective view of our device. Fig. 2 is a side elevation with the foot-levers thrown forward. Fig. 3 is a cross-section on line $x\ x$ of Fig. 2.

Let A represent the wheel, and A' an open center hub, having an annular groove, $a$, formed on its inner edge for the driving and guide wheels, as shown. The wheel may be formed in any manner, preferably with wire spokes similar to those in use on bicycles, and provided with an ordinary tire, which will usually be covered with rubber.

The carriage B, carrying the saddle $b$, for the rider, is formed of two right-angled bars, having guide-wheels C C on their ends and a centrally-placed bearing-wheel, D, immediately under the saddle, as shown. The shaft $d$ of the central bearing-wheel is extended through both sides, and outside its bearings on each end is placed a clutch, $h$, of any desired form, arranged to engage with the shaft on the forward stroke of the levers and allow the shaft to revolve independently when the power is relieved. A ratchet and pawl, ball-clutch, or eccentric friction-clutch will accomplish this object, the latter being preferable, owing to the absence of noise.

On the forward bar of the carriage is a short standard, E, carrying a hand-bar, $e$, which forms the pivot for the foot-levers F, which are provided at their lower ends with treadles $f$, as shown. Under these levers F, and pivoted to the carriage at a lower point, $p$, are the operating-levers G, each provided with a fulcrum-pin or lug, $g$, which moves in the slot $f'$ of the foot-levers. To the lower ends of these operating-levers are attached cords or ropes, which encircle and operate the friction-clutches $h$ on the shaft $d$ of the central bearing-wheel.

The rods F G thus form compound levers, and by providing the operating-levers G, pivoted as shown, a long throw of said levers is made to operate the wheel by a comparatively short stroke of the foot-levers. By adjusting the fulcrum-pins of the levers G on the pivots of said levers up or down with relation to the slots in the foot-levers, more or less throw is given to the said levers G, and consequently more or less action of the cords and clutches on the driving-shaft.

To operate this device the rider mounts the saddle and places his feet on the foot-treadles and his hands on the bar $e$. By moving the left foot forward the compound lever, by its cord and connecting-clutch, rotates the shaft $d$ and central bearing-wheel, D, thus moving the carriage with its rider forward of the center of gravity of the riding-wheel A, and causing said wheel to rotate and begin a forward motion. As the pressure of the foot on the lever is released and the lever comes back for its next stroke the spring of the clutch rotates the clutch backward and winds up the cord ready for the next stroke. Meantime the rider has pushed the right lever forward, which acts in the same manner, and by working the levers alternately the carriage is thus kept forward of the center of gravity and the wheel caused to keep up a continuous revolution, carrying the rider with it.

The central and guide wheels revolve in the annular groove $a$, so that they cannot be displaced, the guide-wheels serving to steady the carriage on which the rider is supported.

It will be evident that the single foot-levers on each side would operate the clutches and driving-shaft without the intervention of the operating-lever; but the compound lever causes less exertion to the rider, who does not have to move his foot so far at each stroke as would be the case with a single lever.

The adjustability of the inner levers, G, by the shifting of the fulcrum-pin or the pivot, admits of the length of stroke being regulated to suit the length of limb of the rider, and also regulates the length of the stroke of the lever.

The wheel is guided in its forward motion by the movement of the body of the rider, who directs its course by swaying his weight to one side or the other. The weight of the rider being always below the center of gravity of the wheel makes it run steadily, when once in motion, from well-known natural laws.

A velocipede of this form will not be as difficult to ride as those where the rider has to sit in a saddle over the wheel, owing to the weight being below instead of above the center of gravity.

With this device a very large wheel can be used, whereas in the case of bicycles the diameter of the driving-wheel has to be in proportion to the length of limb of the rider.

With the large wheel, and the rider sitting below the center of gravity, a slow motion can be maintained and the effort to propel it need not necessarily be great.

Having thus described our invention, what we claim as new, and desire to secure by Letters Patent, is—

1. The levers F G, pivoted to the saddle-bearing frame B, and provided with the adjustable fulcrum-pin $g$, slot $f'$, and foot-treadles $f$, having the fulcrum at a point above said treadles, whereby the end of the inner lever, G, is caused to move through a greater arc than that of the treadles, substantially as herein described.

2. The levers F G, pivoted to the saddle-bearing frame and provided with the fulcrum-pin $g$ and slot $f'$, and the foot-treadles $f$, having the fulcrum at a point above said foot-levers, in combination with an actuating clutch or crank, whereby the throw of the crank or clutch is multiplied with reference to the movement of the treadle, substantially as herein described.

In witness whereof we have hereunto set our hands.

FRIEDRICH LANGMAAK.
PETER STREIFF.

Witnesses:
S. H. NOURSE,
FRANK A. BROOKS.